Oct. 9, 1923.                                    1,469,796
C. J. LAKE
AIRCRAFT
Filed March 16, 1920         4 Sheets-Sheet 1
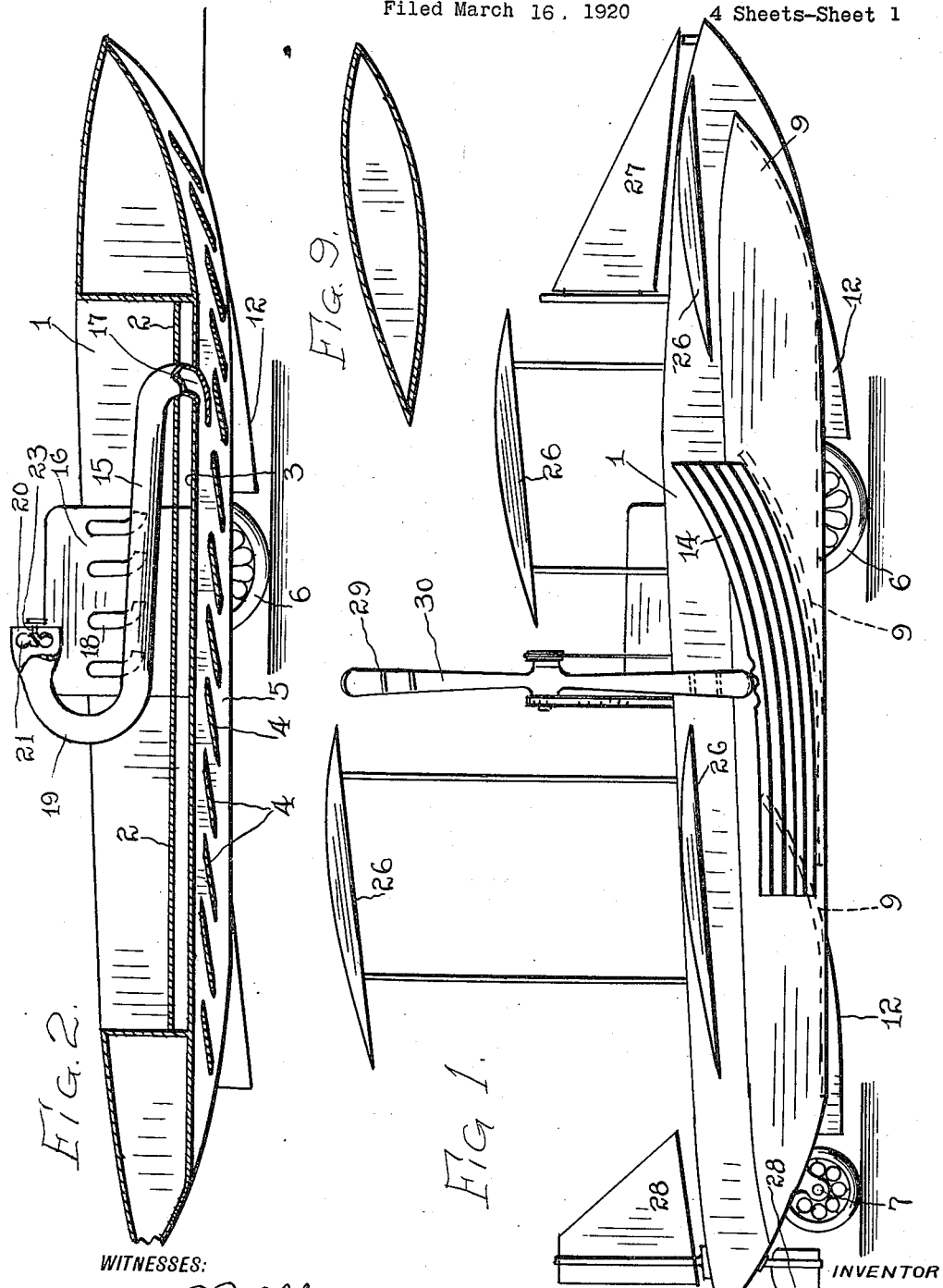
WITNESSES:                                      INVENTOR
                                           Christopher J. Lake
                                         BY
                                                  ATTORNEY Oct. 9, 1923.
C. J. LAKE
AIRCRAFT
Filed March 16, 1920
1,469,796
4 Sheets-Sheet 2
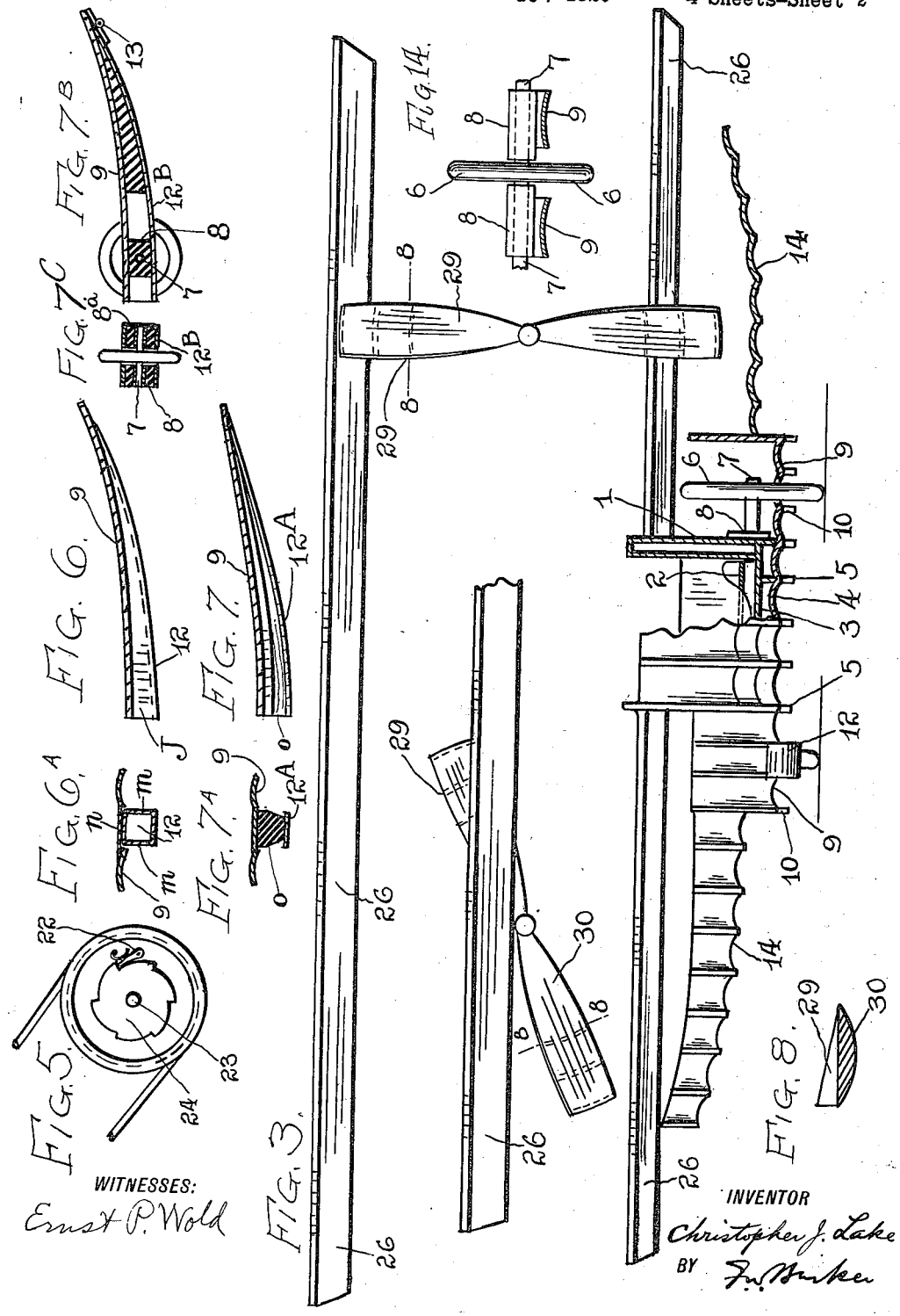
INVENTOR
Christopher J. Lake
BY
ATTORNEY
WITNESSES:
Ernst P. Wold

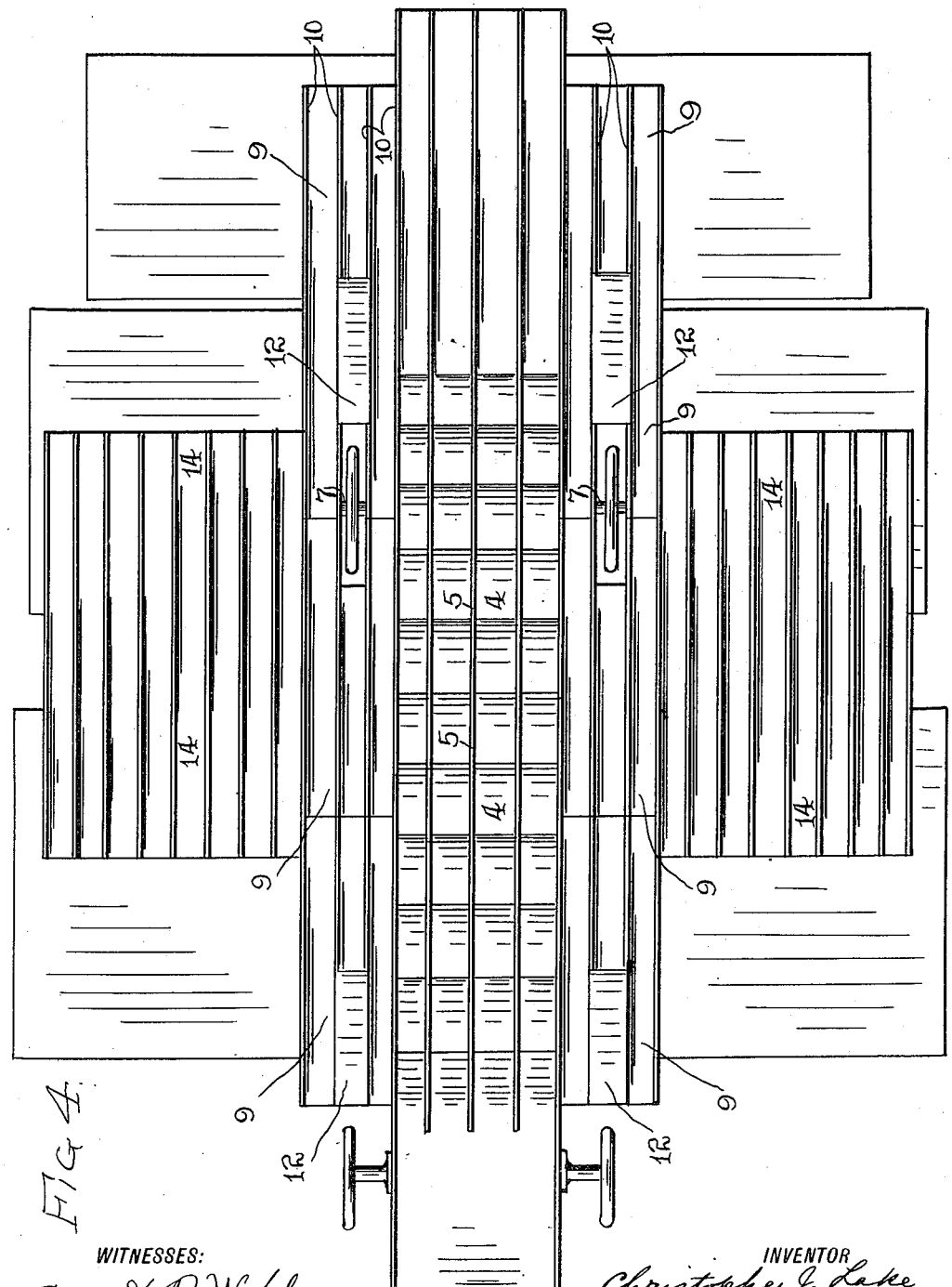

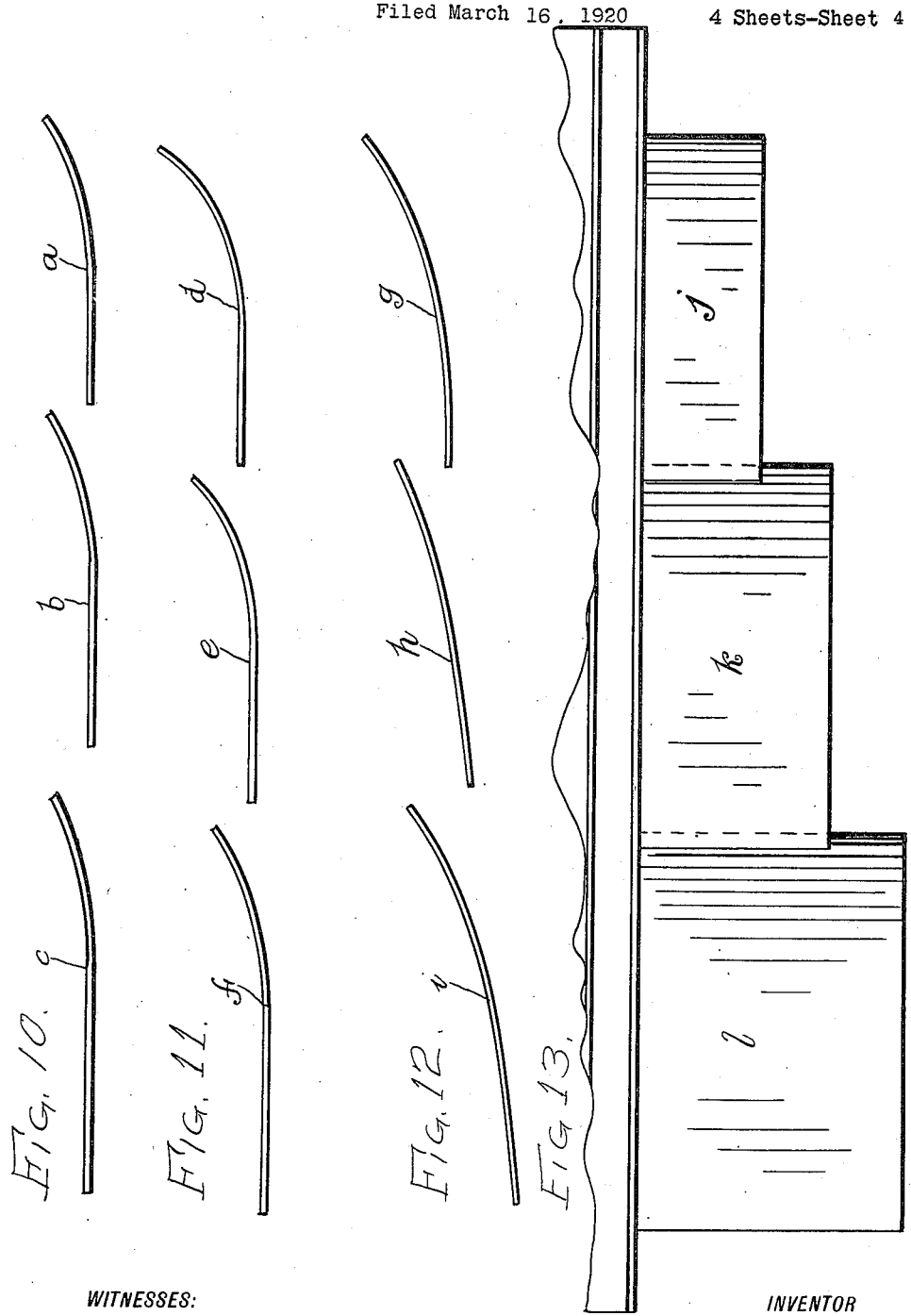

Patented Oct. 9, 1923.

1,469,796

UNITED STATES PATENT OFFICE.

CHRISTOPHER J. LAKE, OF BRIDGEPORT, CONNECTICUT.

AIRCRAFT.

Application filed March 16, 1920. Serial No. 366,273.

*To all whom it may concern:*

Be it known that I, CHRISTOPHER J. LAKE, a citizen of the United States, and resident of Bridgeport, in the county of Fairfield and State of Connecticut, have invented certain new and useful Improvements in Aircraft, of which the following is a specification.

This invention relates to heavier-than-air flying machines, and my improvements are characterized as directed to the production of a machine which is operable upon land, water, snow and ice, and is capable of rising from and alighting upon these different surfaces, to thus constitute what I term a universal flying machine, whose essential elements are all so arranged and coordinated as to constitute an operating unit in their various phases of actuation for the specific purposes they serve, and whose control is centralized in the common control of the machine for manipulation by a single pilot or operator.

My improved flying machine therefore includes in its structure a boat element whereby it may float on water, said boat equipped with wheels for land travel, and flexible skids or runners whereby it may be capable of travel upon snow or ice; whilst the interrelation between these locomotion agencies is such that one is either supplemental to or noninterfering with the functioning of another in operation upon its specific surface, and all are co-active or non-interfering with the means of aerial sustentation.

My universal flying machine includes the provision of a flat-bottomed boat to be of light draught, and which is equipped with wheels for travel on land, and with skids for operating upon snow and ice. The skids also operate to fair-water the wheels on water, to stream-line them in the air, and to fend and protect them from obstructions on land.

The flat-bottomed boat is of cellular construction, according strength thereto, and has its flat bottom surface supplemented with a series of transverse planes or plates, secured to longitudinal stringers, said plates being in slightly separated relation longitudinally and each having an individual forwardly upward inclination. Further said plates are provided with parallel series of longitudinal channels, curved in cross-section, which serve the useful function of dividing the body of supporting water into furrows, thus lessening the forceful effects of a sea tending to disturb the equilibrium of the boat, besides having their forward ends above the water line, thus entrapping air to cushion the boat's support, and causing the sea to flow by easy tangent streams underneath the boat, mitigating the shock thereon, and lifting the boat upon and over the waves with least resistance, instead of permitting it to suffer the impact of a push wave as with a straight flat bow. The said supplemental bottom formation also has the effect of shielding and protecting the hull from damage by obstructions or floatage, and in running through or out upon ice.

The said channels serve other useful purposes, as, extending longitudinally, they form parallel stream guides that cause the boat to run steadier and steer easier; they also alleviate the rolling and crab-sidling tendency of a flat bottom in a sea or beam wind, and form a series of passages to convey the air current under the boat, which reduces frictional skin resistance, and relieves the suctional stern wave, also assisting in the prevention of settling of the boat at the stern and the consequent rise thereof at the bow.

It is well known that after the maximum efficient speed of an ordinary high powered boat is reached it requires great excess of power to obtain an additional knot, owing principally to what is known as speed wave formations which the boat makes from the displacing and suctional resistance of the water, and their tendency to rise at the bow and settle at the stern which increases the cross sectional displacement with relative resistance. Therefore, to accelerate speed and to cause the boat to mount over the waves and skim over the surface of water lightly with as little displacement and suction as possible, I provide concaved air and wave planes, their function being to alleviate and surmount incoming waves and prevent the formation of the so-called speed waves. Said planes are attached to the sides of the boat approximant the wave and water lines and the bottom of the boat, i. e., the forward ends are above and the after ends below the water line and extending consecutively the length of the boat. They subdivide the waves and distribute their force relatively to the planes and over an extended area outside of the boat proper, conserving their force into an extended lift devoid of shock.

The forward ends of the wave planes being air bound, air is forced underneath the planes according to the speed and is trapped thereunder by the water, as the planes extend below the waterline of the boat and approximately to the rear point of the plane leaving the water.

The wave planes also perform the function of protecting the boat and its occupants from flying spray due to waves or high speed, and constituting air planes placed at an angle of incidence to the horizontal they produce an effective lift extending over the length of the boat and prevent the boat from dropping in between the waves, so that the boat is caused to practically take a horizontal path over the tops of the waves according to the travel speed, and further to lessen the water displacement, the degree of spray and the speed waves, and to accelerate the travel speed.

By my system of side plane combination, said tendency of speed boats to rise excessively at the bow and settle excessively at the stern, is overcome or diminished either by varying the size, the height, or the angle of incidence in the fore and after planes, to produce the proper level for a minimum displacement and angle of incidence relatively to both air and water, for the maximum lifting efficiency.

Also, supplemental to the wave planes I provide auxiliary spray planes which may be of buoyant character and extend out laterally from the wave planes, acting as shields to prevent water from splashing into the boat, propellers, motors, etc., said spray planes being provided with parallel channels, curved in cross section like those of the wave planes, to divide and localize the wave formations at the sides of the boat, while exerting a steadying and lifting effect, thus dispensing with the usual outrigged steadying means which prove disastrous in a sea.

The advantage of introducing air under the bottom of a boat when induced by vacuum and without pressure is well known to reduce water friction, but air under pressure is more efficient and positive. In my earlier patents I have provided means for creating a current of air under the boat bottom by the impulse of the exhaust, etc., but I find in practice that the intermittent exhaust with a limited number of cylinders gives an uneven air current that produces perceptible pulsation to the movement of the boat. Therefore, to obviate this condition I provide a fan or blower in the mouth of an open air exhaust conduit so that the fan is actuated and rotated by the impulses of the exhaust and the air thereby drawn in, and in turn the fan will by its accumulated force transmit and supply additional air into and through the conduit between the exhaust impulses, thus steadying the current with constant pressure and velocity which eliminates the speed pulsations even more than a fly wheel steadies a reciprocating engine.

I also provide auxiliary means to drive the blower from the motor through connections therewith by any suitable means of gearing or belting, if it be desirable to give a greater pressure current than the exhaust provides in view of the fact that the more free air that can be impulsed and expanded into velocity, the better the result, but the exhaust gases being a waste product it is desirable in many cases to utilize it to its capacity in creating the air current before calling upon the motor for power to the same end.

Preferably I mount the drive pulley or gear with a one way ratchet so that if the exhaust drives the blower as fast or faster than the speed of the motor shaft the motor does no work, but should the exhaust fail to maintain the desired speed the ratchet will cause the fan to maintain its relative speed.

The steady current of air with pressure velocity, also insures a peculiar and important advantage in the efficiency of the motor as follows: As the air current passes any exhausting nozzle it is accelerated by the exhaust impact of free air, which eliminates back pressure and draws out the spent or dead gases from the exhausting cylinder, thus effectively scavenging each firing cylinder before the exhaust valve closes, a much desired and efficient result, and a hitherto difficult problem.

It also extracts the residuary lubricant from the motor and distributes it to the underside of the boat, where, being lighter than water it will rise to and contact with and lubricate the boat bottom, and in a storm and heavy seas the escaping oil will calm the troubled waters. The bottom of the boat will also be preserved by the oil and kept clean from marine growth by the deadly gases, also the usual disagreeable smutting effects of the exhaust gases will be diminished.

The pressure and velocity of the air current guarantees a constant propulsive and lifting force from under the boat whether on water or in the air.

The difficulty in steering and controlling a flat bottomed light draft boat, especially on a turn or at high speed or in a sea or side wind, is well known. The present practice is to extend the rudder and a keel or skag well below the bottom of the boat to support the rudder and prevent side drift; this is objectionable and troublesome and practically nullifies the light draft intent for shoal waters.

I overcome this difficulty by the series of curved longitudinal channel ways in combination with a vertical rudder placed either in front or rear, and for special efficiency for high speed I prefer one forward and one aft operable in unison as they are thus more effective, to diminish side drift, and with the rear rudder taking effect in the water as well as in the air.

By experiment I have learned that a considerable inefficiency of present air propellers is due to the air slipping toward and off the ends of the propeller in an oblique direction instead of pushing in a direct line of travel.

Therefore, I have devised means to obviate this inefficiency by placing guide vanes on the face of the propeller in the circular line of revolution, their face or cutting edges being flush with the propeller forward or cutting edge and increasing in width toward the rear edge of the propeller. These vanes enable the propeller to take firmer grip on the air and impel it directly rearward with the thrust or push in the line of travel.

Considerable difficulty has been experienced in adapting flying machines and boats to travel interchangeably from land to water, and vice versa. Attempts to overcome this difficulty have been made by arranging the wheels to be raised when on water and lowered for use on land and vice versa, and while this expedient answers the purpose in a degree, it adds complication and is either of weak structure or calls for considerable weight, and needs special care and manipulation by the operator at every requirement of interchange.

I obviate these difficulties and secure special advantages by a novel arrangement of fixed resilient wheels, or a resilient attachment of the wheels adjacent the sides of the boat and extending below the bottom thereof, in combination with my improved "wave plane" and flexible inclined runners in front of the wheels as auxiliary supports and fenders therefor, to lead the wheels over obstructions, and prevent their dropping into holes, ditches, etc., while on land, and on water to protect said wheels from floatage, or shoal sand bars, or solid ice, as the fenders will enable the machine to run out upon and over the same, and will also force the waves and both water and air currents past the wheels with the least resistance and without injury thereto, while in running over obstructions on land or water the runners will supplement and coact in advance with the wheels and take a portion of the wheel load, and permit the control and course to be at all times subject to the will of the operator without forethought or previous warning, whether the machine be operating on land, water, snow or ice, or in the air.

In the drawings:—

Figure 1 is a side elevation of my universal airplane, including front and rear wheels as for a machine of relatively large size.

Fig. 2 is a longitudinal sectional view of the boat portion alone, particularly showing the means of applying the engine exhaust, plus air under pressure, at the under surface of the boat.

Fig. 3 is a front elevation of the machine, showing the structure and relative arrangement of its component elements.

Fig. 4 is a bottom plan view of the machine.

Fig. 5 is a detail of the ratchet and pawl means for driving the fan from the engine shaft supplemental to the power of the exhaust gases.

Fig. 6 is a side elevation of a wave plane, with runner attached.

Fig. 6$^A$ is a rear sectional view on the line 6$^A$ 6$^A$ of Fig. 6.

Fig. 7 is a side elevation of a wave plane with modified form of cushioned runner, having a steel shoe.

Fig. 7$^A$ is a rear view of Fig. 7.

Fig. 7$^B$ is a side section showing the cushioned runner connected with the cushioned bearing for a wheel.

Fig. 7$^C$ is an end view of Fig. 7$^B$.

Fig. 8 is a cross section of a propeller blade on the line 8—8 of Fig. 3.

Fig. 9 is a longitudinal section of a buoyant wave plane.

Fig. 10 is a side elevation of a longitudinal series of wave planes characterized by said planes increasing in chord extent from front to rear of the series.

Fig. 11 is a similar view of a modified series of said wave planes, characterized by the height thereof decreasing from front to rear of said series.

Fig. 12 is a simlar view of a further modified series of said wave planes characterized by the angle of incidence thereof increasing progressively from front to rear of said series.

Fig. 13 is a plan view of a further modified series of said wave planes, characterized by the span or width of said planes increasing progressively from front to rear of said series, and Fig. 14 is a front elevation of a resilient wheel rigidly attached to a wave plane.

In carrying out my invention I construct the boat portion of the machine with side walls 1 and a closed bottom 2, which latter comprises the upper bottom for a cellular structure 3 designed to accord strength and rigidity to the boat.

Beneath structure 3, and in spaced relation therewith I provide a series of transversely arranged inclined plates 4, wherein each plate is separated longitudinally from adjacent plates, and said plates are secured to a series of spaced, longitudinal stringers 5.

The plates 4 of the series are arranged in forwardly upward inclinations, and each plate is given a number of transverse curvatures or concavations, the effect whereof is to confine the body of supporting water beneath the boat in a series of longitudinal furrows, for the various purposes set forth.

Wheels, as 6, are provided for land travel of the machine, the wheels being carried by shafts 7, whose bearings 8 may be resiliently mounted in the boat sides 1 as by cushions 8ª. For larger machines both front and rear wheels may be used, but for smaller machines front wheels only are necessary.

Extended out laterally from the boat proper, at each side thereof, are longitudinally arranged series of what I call wave planes 9, whose purposes are to fulfill the various functions adduced to them in the preamble to this description.

Said wave planes are carried by longitudinal stringers, 10, and consist each of parallel elements that are concave in transverse section. The wave planes of the series are separated longitudinally and arranged in order to have progressively enhanced efficiency from the front to the rear of the boat. This rearward increase in efficiency of the wave plane series may be achieved in different manners. Thus, in Fig. 10 the series comprising planes $a$, $b$ and $c$ shows the planes all in the same horizontal level but of different chord extents, wherein the forward plane $a$ has a shorter chord than plane $b$, which latter is of shorter chord than rear plane $c$.

In the series of Fig. 11 the planes $d$, $e$ and $f$ are all of the same chord extent but are arranged in different levels, wherein the forward plane $d$ is a higher level than plane $e$ and plane $e$ is in a higher level than rear plane $f$.

In the series of Fig. 12 the planes $g$, $h$ and $i$ are each of the same length, but forward plane $g$ has a less angle of incidence than plane $h$, and plane $h$ has a less angle of incidence than rear plane $i$.

In the series of wave planes $j$, $k$ and $l$ of Fig. 13, the rearwardly progressive enhanced efficiency thereof is attained by increasing the width of said planes from front to rear.

The effect with each series is to afford increased lift progressively from front to rear of the boat.

The wave planes, or some of them, are provided with skids or runners 12, (Fig. 6) comprising curved strips or members attached to the under surfaces respectively of the wave planes and extending rearwardly beneath the wave planes to near the low level of the wheels, in advance thereof. Said skids or runners are either of resilient character or are resiliently mounted, in order that they may absorb the shock of impact with obstacles in their path which they surmount, while also fending the wheels therefrom and leading them thereover.

In Figs. 6 and 6ᴬ the skids or runners 12 are shown as of a hollow, box like structure having walls $m$, and as having vertical movement through a cut away portion of the wave planes to which they are attached; the cut away portion having a flexible covering $n$ as of rubber.

In Figs. 7 and 7ᴬ the runners 12ᴬ there shown, while also spaced below the wave planes, are accorded individual flexibility in a vertical direction by reason of the spacing being occupied by elastic material $o$, such as rubber, which by compression and expansion permits the runners to yield relatively to the wave planes.

Still further, in the modification of Fig. 7ᴮ, the runners 12ᴮ are shown as engaged at their rear ends with the cushioned bearings 8 of the wheels, by which means the vertical yielding movement of the wheels is imparted to the runners 12ᴮ, which in this instance may have a hinged connection, as 13, at their forward ends, with the wave planes. Therefore, with the arrangement of Fig. 7ᴮ the runner and its associated wheel will have co-ordinated vertical movement and the relative height arrangement of said elements will be maintained under all conditions of operation wherein the runner leads the wheel over obstructions and inequalities of surface in the line of travel.

The spray planes, shown in the drawings at 14, are of moderate span only, and are intermediately located with relation to the length of the boat, underneath the propellers, and serve as shields to guard the propellers and engines from flying spray, in fact the spray planes, as shown, serve to protect the propellers and act as lateral steadying supports for the machine.

These spray planes, which are shown as set at a dihedral angle to thus permit a moderate roll to the boat, are provided with a series of longitudinal parallel channels that are curved in cross-section, like the channels of the wave planes, to divide the contacting waves into furrows, thus lessening their impacting force against said spray planes, and to carry out the general scheme of directional stream flows instituted by the channelled boat bottom plates and the wave planes.

The wave planes, also the spray planes, may if desired be of buoyant character, and, in Fig. 9, a sectional view is given of a hollow plane to convey the idea of buoyancy as applicable to either the wave or spray planes.

In my earlier Patents Nos. 913,515, 918,-336, 1,041,489, and 1,307,135, I have provided for the introduction of engine exhaust gases and air to the under surface of a boat for the purpose of providing a fluid cushion between the boat bottom and the body of supporting water, and also to afford some propulsive effect both in water and in air, due to the rearward direction of flow given the streams of exhaust gases and air, but in my present application I have improved the structure and arrangement of parts whereby these results are achieved, in order that greater efficiency may be attained.

Thus, (see Fig. 2) the exhaust manifold 15 from the engine 16, is given a forward direction down to its point of efflux 17, where it communicates with the space beneath the boat bottom which is bounded by the inclined plates 4, so that the gases and air, issuing at that point, find their exit between the interspaces which separate the succeeding plates 4 Individual exhaust pipes 18 convey the exhaust gases from the separate cylinders of the engine to manifold 15 into which they are entered in a forward direction. A rearward U-bend extension 19 of manifold 15 has a forwardly directed cowl-like opening 20 for the admission of air under the pressure caused by the travel speed of the craft. This pressure is augmented by a fan 21, mounted in opening 20, and, through the medium of pawl 22 carried by the fan shaft 23, engaging the one way ratchet 24 when the engine speed exceeds the exhaust induced air pressure speed of the fan 21, since said fan and the ratchet 24 are both carried by the same shaft 23.

The addition of the air current in constant volume to the manifold 15 has the effect of transforming the intermittent exhaust impulses in said manifold into a continuous fluid flow, thereby enhancing the efficiency value of the mingled fluid stream emitted at the efflux point 17, as will be apparent.

The features of improvement herein described are shown in the drawings as applied to an airplane having the supporting planes or aerofoils 26, and, for directional purposes I have provided the vertical, directional rudders 27, 28, located, respectively, at the front and rear of the machine, the rear rudder 28 being arranged with relation to the flat bottomed boat so that said rudder takes effect in the water as well as when the machine is in flight. Thus, the rudder 28 extends down to a point below the water line of the boat, though not below its bottom, for steering purposes.

Preferably, the rudders 27, 28, are arranged to turn in opposite directions, to thereby diminish the effect of drift tendencies by the creation of a balanced turning couple.

When in water, steering is greatly facilitated through the course maintaining characteristic of the longitudinal channels auxiliary to the boat bottom.

Also, in my improved aircraft I have devised means for increasing the propulsive efficiency by the provision of transverse ridges 29 located upon the rearward surfaces of the propeller blades 30, said ridges being of form which tapers toward the forward edge of the blade and increases in depth rearwardly, to thereby radially confine the air acted upon by the revolving blade and increase its compressibility as a resisting and therefore a power creating medium and directing its power thrust in the line of travel.

Variations may be resorted to within the spirit and scope of my invention and parts thereof used without others.

I claim:

1. A hull for floating bodies having a longitudinal series of parallel walls extending beneath the bottom thereof, and a series of longitudinally separated base plates, intersecting said walls, each curved in cross section between adjacent walls, to divide the body of supporting water into furrows.

2. In a hull for floating bodies with a closed bottom, the provision of a longitudinal series of parallel walls extending beneath the bottom thereof, and a series of longitudinally separated base plates, arranged with angles of incidence, intersecting said walls, each curved in cross section between adjacent walls, to divide the body of supporting water into furrows.

3. In a hull for floating bodies with a closed bottom, the provision of a longitudinal series of parallel walls extending beneath the bottom thereof, and a series of longitudinally separated base plates, spaced below said hull bottom, arranged with angles of incidence, intersecting said walls, each curved in cross section between adjacent walls, to divide the body of supporting water into furrows.

4. In a hull for floating bodies with a closed bottom, the provision of a longitudinal series of parallel walls extending beneath the bottom thereof, a series of longitudinally separated base plates, spaced below said hull bottom, arranged with angles of incidence, intersecting said walls, each curved in cross section between adjacent walls, to divide the body of supporting water into furrows, and means for introducing fluid under pressure intermediate said hull bottom and plates, for issuance between the latter.

5. A hull for floating bodies having series of lengthwise succeeding wave planes projecting laterally from its opposite sides, the forward ends of the planes extending above the water line, and their rearward ends extending air entrappingly below the water line.

6. A hull for floating bodies having series of lengthwise succeeding, separate wave planes projecting laterally from its opposite sides, the forward ends of the planes extending above the water line, and their rearward ends extending air entrappingly below the water line.

7. A hull for floating bodies having series of longitudinally separated wave planes arranged at its opposite sides, said planes provided with parallel, longitudinal base channels that are curved in cross-section.

8. A hull for floating bodies having series of longitudinally separated wave planes at its opposite sides arranged with progressively increasing angles of incidence from front to rear of the series.

9. A hull for floating bodies having wheels for traction upon solid surfaces, non-oscillable journal bearings for the wheels, and vertically flexible runners extended from the bearings in advance of said wheels to lead them over surface irregularities.

10. A hull for floating bodies having wheels for traction upon solid surfaces, vertically yieldable, non-oscillable journal bearings for said wheels, and runners carried by said bearings and disposed in advance of said wheels, to yield therewith and lead said wheels over surface irregularities.

11. A hull for floating bodies having wave planes arranged at its opposite sides, wheels mounted in non-oscillable bearings on said hull for traction upon solid surfaces, and flexible runners carried by said planes in advance of said wheels, to lead the latter over surface irregularities.

12. The combination, with a hull for floating bodies, having wave planes projecting from its opposite sides, of spray planes extending from the wave planes in transverse relation to an intermediate portion of the hull which includes the power plant, to shield said portion from spray.

13. The combination, with a hull for floating bodies, of spray planes extended at opposite sides from an intermediate portion thereof which includes the power plant, to shield said portion from spray, said spray planes characterized as having parallel, longitudinal channels, curved in cross-section.

14. The combination, in a flying machine, having a hull and an engine, of an exhaust manifold communicating forwardly with the base of said hull, individual means of cylinder exhaust efflux to said manifold, said manifold provided with a rearward bend having a forward entrance, and a fan located near said entrance to be operable by exhaust induced suction in conveying air through said manifold in mingled relation with the exhaust products.

15. The combination, in a flying machine, having a hull and an engine, of an exhaust manifold communicating forwardly with the base of said hull, individual means of cylinder exhaust efflux to said manifold, a rearward bend with a forward entrance for said manifold, a fan located near said entrance to be operable by exhaust induced suction in conveying air through said manifold in mingled relation with the exhaust products, and means actuated by the engine shaft to drive the fan when the engine speed is in excess of the speed at which said fan is driven by the exhaust.

Signed at borough of Manhattan in the city, county and State of New York, this 11th day of March A. D. 1920.

CHRISTOPHER J. LAKE.